(12) United States Patent
Wang et al.

(10) Patent No.: US 10,506,593 B2
(45) Date of Patent: Dec. 10, 2019

(54) DATA TRANSMISSION METHOD AND DEVICE IN UNLICENSED FREQUENCY BAND

(71) Applicant: China Academy of Telecommunications Technology, Beijing (CN)

(72) Inventors: Jiaqing Wang, Beijing (CN); Xueming Pan, Beijing (CN); Weijie Xu, Beijing (CN); Zukang Shen, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 127 days.

(21) Appl. No.: 15/524,503

(22) PCT Filed: Oct. 14, 2015

(86) PCT No.: PCT/CN2015/091948
§ 371 (c)(1),
(2) Date: May 4, 2017

(87) PCT Pub. No.: WO2016/070704
PCT Pub. Date: May 12, 2016

(65) Prior Publication Data
US 2017/0332379 A1 Nov. 16, 2017

(30) Foreign Application Priority Data
Nov. 5, 2014 (CN) .......................... 2014 1 0638168

(51) Int. Cl.
*H04J 3/00* (2006.01)
*H04W 72/04* (2009.01)
(Continued)

(52) U.S. Cl.
CPC ........... *H04W 72/0453* (2013.01); *H04L 1/00* (2013.01); *H04L 5/0044* (2013.01); *H04L 27/26* (2013.01);
(Continued)

(58) Field of Classification Search
CPC .......... H04W 72/042; H04W 72/0413; H04W 72/0406; H04W 72/0446; H04W 72/0453
See application file for complete search history.

(56) References Cited

U.S. PATENT DOCUMENTS

| 8,861,437 B2 | 10/2014 | Stanwood et al. |
| 2013/0039284 A1* | 2/2013 | Marinier ................. H04L 5/001 370/329 |

(Continued)

FOREIGN PATENT DOCUMENTS

| CN | 101743705 A | 6/2010 |
| CN | 103765824 A | 4/2014 |

(Continued)

*Primary Examiner* — Atique Ahmed
(74) *Attorney, Agent, or Firm* — Foley & Lardner LLP (57) ABSTRACT

The present invention relates to the technical field of mobile communications. Embodiments of the present invention provide a data transmission method and device in an unlicensed frequency band. The method comprises: determining a termination position of to-be-transmitted data in a radio frame in an unlicensed frequency band; determining position indication information according to the termination position; and sending the position indication information, so that a user equipment determines, according to the position indication information, the termination position of the to-be-transmitted data in the radio frame in the unlicensed frequency band. In the method provided by the embodiments of the present invention, a termination position of transmitted data in a radio frame in an unlicensed frequency band is indicated to a user equipment by using position indication information, so that the user equipment is enabled to determine, according to the position indication information, the termination position of the transmitted data in the radio frame, and therefore accurately receives the data according to the termination position and the receiving position of the transmitted data.

16 Claims, 6 Drawing Sheets

(51) Int. Cl.
   *H04L 1/00* (2006.01)
   *H04L 27/26* (2006.01)
   *H04W 72/14* (2009.01)
   *H04L 5/00* (2006.01)
   *H04W 72/12* (2009.01)
   *H04W 88/06* (2009.01)

(52) U.S. Cl.
   CPC ..... *H04W 72/042* (2013.01); *H04W 72/0446* (2013.01); *H04W 72/1289* (2013.01); *H04W 72/14* (2013.01); *H04L 5/0007* (2013.01); *H04L 5/0073* (2013.01); *H04W 88/06* (2013.01)

(56) References Cited

U.S. PATENT DOCUMENTS

| | | | |
|---|---|---|---|
| 2014/0003387 A1* | 1/2014 | Lee | H04L 5/001 370/330 |
| 2014/0056244 A1 | 2/2014 | Frenne et al. | |
| 2014/0112289 A1* | 4/2014 | Kim | H04W 16/14 370/329 |
| 2014/0177547 A1 | 6/2014 | Guo et al. | |
| 2014/0307693 A1 | 10/2014 | Feng et al. | |
| 2014/0313945 A1* | 10/2014 | Beale | H04L 5/14 370/277 |
| 2014/0335876 A1* | 11/2014 | Ratasuk | H04W 16/14 455/450 |
| 2015/0049708 A1* | 2/2015 | Damnjanovic | H04L 1/1812 370/329 |
| 2015/0237626 A1* | 8/2015 | Li | H04L 5/00 370/280 |
| 2016/0183204 A1* | 6/2016 | Seo | H04L 5/0048 455/127.2 |
| 2017/0164345 A1* | 6/2017 | Goto | H04J 11/00 |
| 2017/0280331 A1* | 9/2017 | Gou | H04L 5/0007 |

FOREIGN PATENT DOCUMENTS

| | | |
|---|---|---|
| CN | 104066145 A | 9/2014 |
| JP | 2017-526218 A | 9/2017 |
| WO | WO-2010/121411 A1 | 10/2010 |
| WO | WO2013/006006 A2 | 1/2013 |

* cited by examiner

DATA TRANSMISSION METHOD AND DEVICE IN UNLICENSED FREQUENCY BAND

This application is a US National Stage of International Application No. PCT/CN2015/091948, filed on Oct. 14, 2015, designating the United States, and claiming the benefit of Chinese Patent Application No. 201410638168.5, filed with the Chinese Patent Office on Nov. 5, 2014 and entitled "Method and apparatus for transmitting data in an unlicensed frequency band", which is hereby incorporated by reference in its entirety.

FIELD

The present invention relates to the field of mobile communications, and particularly to a method and apparatus for transmitting data in an unlicensed frequency band.

BACKGROUND

As there are a constantly growing number of mobile data services, frequency band resources appear more and more insufficient, and a demand for a large number of mobile data services may not be satisfied by deploying a network and transmitting the services only over licensed frequency band resources, so transmission of the mobile data services may alternatively be deployed over unlicensed frequency band resources so as to increase the utilization ratio of the frequency band resources, and to improve experiences of users, where a mobile data service is transmitted in an unlicensed frequency band which is a secondary carrier with the assistance of a primary carrier in a licensed frequency band.

The unlicensed frequency bands can be shared by various wireless communication systems, e.g., Bluetooth, Wireless Fidelity (WiFi), and other systems, all of which access the shared unlicensed frequency band resources by competing for the resources, so coexistence between Unlicensed Long Term Evolution (simply U-LTE or LTE-U) systems deployed by different operators, and between the LTE-U systems, and the WiFi and other wireless communication systems has been studied as a focus.

Figure 1:
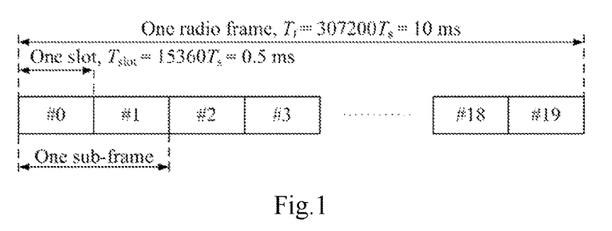
FIG. 1 is a schematic structural diagram of a first type of frame applicable to an FDD system in the prior art.
Figure 2:
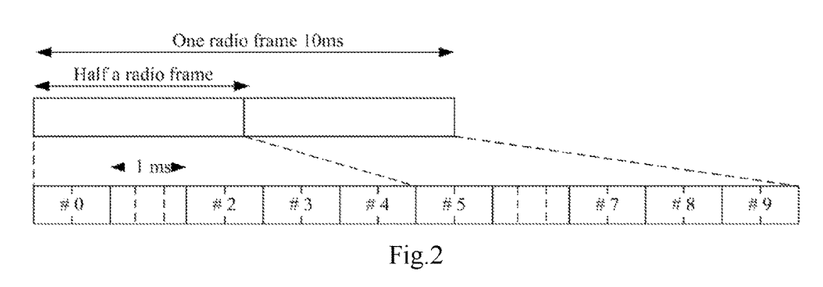
FIG. 2 is a schematic structural diagram of a second type of frame applicable to a TDD system in the prior art.

The LTE system supports two duplex modes of Frequency Division Duplex (FDD) and Time Division Duplex (TDD) to which there are different frame structures applicable. The two frame structures are common in that each radio frame includes 10 sub-frames of 1 ms. A first type of frame structure applicable to the FDD system is as illustrated in FIG. 1, and a second type of frame structure applicable to the TDD system is as illustrated in FIG. 2.

As can be apparent from the LTE frame structures, data are transmitted in both of the frame structures in the unit of a sub-frame with a length of time which is 1 ms, but in the LTE-U system, due to contention based access in the Listen Before Talk (LBT) mode, a period of time for an eNB to prepare for data, a period of time for the eNB to prepare for a radio frequency, and other factors, an LTE-U signal may be transmitted starting in time at such any location in some sub-frame that the incomplete sub-frame is transmitted, that is, the length of time of the physical resource is less than the length of a normal sub-frame. If no signal is transmitted in the incomplete sub-frame, then the resource will be preempted by one of the other nodes intensively competing for the resource.

Since the LTE-U system is designed to guarantee fair competition between the LTE-U system and the Wi-Fi system, a period of time for the LTE-U system to transmit once is appropriately 10 ms, and preferably no more than 40 ms. If the LTE-U system transmits once for a period of time of at most 10 ms, then the systems will compete for an access in such an incomplete sub-frame that the sub-frame available as a result is also the incomplete sub-frame. If no data are transmitted in either of two incomplete sub-frames, then the efficiency of transmission in the LTE-U system will be degraded by a factor of at least 10%. If the LTE-U system transmits once for a period of time of at most 4 ms, and no data are transmitted in either of two incomplete sub-frames, then the efficiency of transmission in the LTE-U system will be degraded by a factor of at least 25%, so if no data are transmitted in any incomplete sub-frame, then it will be unacceptable from both the perspective of resource utilization and the technological perspective. Accordingly if an incomplete sub-frame is transmitted over a resource over which a complete sub-frame fails to be transmitted, and data are transmitted in the incomplete sub-frame, then the efficiency of data transmission will be improved, and the resource can be avoided from being wasted. There has been absent an integrated solution to transmission of data in an incomplete sub-frame in an unlicensed frequency band in an LTE system.

In summary, there has been absent in the prior art a solution to transmission of data in an incomplete sub-frame in an unlicensed frequency band.

SUMMARY

Embodiments of the invention provide a method and apparatus for transmitting data in an unlicensed frequency band so as to address how to transmit data in an incomplete sub-frame in an unlicensed frequency band.

An embodiment of the invention provides a method for transmitting data in an unlicensed frequency band, the method including:
  determining an end position of data to be transmitted, in a radio frame over the unlicensed frequency band;
  determining a position indication information according to the end position, wherein the position indication information instructs a user equipment to determine the end position of the data to be transmitted, in the radio frame over the unlicensed frequency band according to the position indication information; and
  sending the position indication information to the user equipment.

Preferably the position indication information is a sequence prescribed between a network device and the user equipment.

Preferably a symbol where the sequence is located is located in time domain in any one prescribed symbol between a start symbol and an end symbol where the data to be transmitted are transmitted, or in the start symbol where the data to be transmitted are transmitted, wherein the sequence occupies all the bandwidth or a specified part of the bandwidth in the frequency domain; or
  a symbol where the sequence is located is the end symbol where the data to be transmitted are transmitted, wherein the sequence occupies a specified part of the bandwidth.

Preferably the position indication information is sent to the user equipment via signaling, wherein the signaling is located in a symbol prescribed between the network device and the user equipment.

Preferably the signaling occupies a part of the bandwidth of the prescribed symbol.

Preferably the signaling is configured in a prescribed symbol in any one sub-frame between a sub-frame where a successful contention based access is achieved, and a sub-frame where the last complete available symbol, where the data to be transmitted are transmitted, is located.

Preferably the signaling is configured in the last complete available symbol in the sub-frame where a successful contention based access is achieved.

Preferably the signaling is carried over a carrier in the unlicensed frequency band, or carried over a primary carrier or a secondary carrier in a licensed frequency band.

Preferably the signaling is indicated in a Downlink (DL) grant of a Physical Downlink Shared Channel (PDSCH), or a DL grant of an enhanced Physical Downlink Control Channel (ePDCCH), over a secondary carrier in the unlicensed frequency band; or
the signaling is indicated in a DL grant of a PDSCH, or a DL grant of an ePDCCH, over a primary carrier in a licensed frequency band.

Preferably the signaling is further configured to indicate a position of a last sub-frame of channel occupancy time period on the unlicensed frequency.

Preferably in a sub-frame where the end position of the data to be transmitted is located, a PDSCH and an ePDCCH are transmitted in a frequency-division multiplexed mode, start points in time domain of the PDSCH and the ePDCCH are the same, and end points in time domain of the PDSCH and the ePDCCH are the same; and the start points in time domain of the PDSCH and the ePDCCH are located at a start point of the sub-frame where the end position of the data to be transmitted is located.

Preferably the end position of the data to be transmitted, in the radio frame is an end symbol of a PDSCH or an ePDCCH.

An embodiment of the invention further provides a method for transmitting data in an unlicensed frequency band, the method including:
receiving, by a user equipment, a position indication information of a radio frame in an unlicensed frequency band; and
determining, by the user equipment, an end position of transmitted data in a radio frame in the unlicensed frequency band according to the position indication information.

Preferably the position indication information is a sequence prescribed between a network device and the user equipment.

Preferably determining, by the user equipment, the end position of the transmitted data in the radio frame in the unlicensed frequency band according to the position indication information includes:
determining, by the user equipment, the sequence in any one prescribed symbol between a start symbol and an end symbol where the data to be transmitted are transmitted, or in the start symbol where the data to be transmitted are transmitted, wherein the sequence occupies all the bandwidth or a specified part of the bandwidth in the frequency domain; or
determining, by the user equipment, the sequence in the end symbol where the data to be transmitted are transmitted, wherein the sequence occupies a specified part of the bandwidth.

Preferably the user equipment receives the position indication information in the radio frame in the unlicensed frequency band via signaling, wherein the signaling is located in a symbol prescribed between the network device and the user equipment.

Preferably the signaling occupies a part of the bandwidth of the prescribed symbol.

Preferably the signaling is configured in a prescribed symbol in any one sub-frame between a sub-frame where a successful contention based access is achieved, and a sub-frame where the last complete available symbol, where the data to be transmitted are transmitted, is located.

Preferably the signaling is configured in the last complete available symbol in the sub-frame where a successful contention based access is achieved.

Preferably receiving, by the user equipment, the position indication information in the radio frame in the unlicensed frequency band includes:
obtaining, by the user equipment, the signaling over a carrier in the unlicensed frequency band, or a primary carrier or a secondary carrier in a licensed frequency band.

Preferably receiving, by the user equipment, the position indication information in the radio frame in the unlicensed frequency band includes:
obtaining, by the user equipment, the signaling in a DL grant of a Physical Downlink Shared Channel (PDSCH), or a DL grant of an enhanced Physical Downlink Control Channel (ePDCCH), over a secondary carrier in the unlicensed frequency band; or
obtaining, by the user equipment, the signaling in a DL grant of a PDSCH, or a DL grant of an ePDCCH, over a primary carrier in a licensed frequency band.

Preferably the user equipment further obtains from the signaling a position of a last sub-frame of channel occupancy time period on the unlicensed frequency.

Preferably in a sub-frame where the end position of the data to be transmitted is located, a PDSCH and an ePDCCH are transmitted in a frequency-division multiplexed mode, start points in time domain of the PDSCH and the ePDCCH are the same, and end points in time domain of the PDSCH and the ePDCCH are the same; and the start points in time domain of the PDSCH and the ePDCCH are located at a start point of the sub-frame where the end position of the data to be transmitted is located.

Preferably the end position of the data to be transmitted, in the radio frame is an end symbol of a PDSCH or an ePDCCH.

An embodiment of the invention provides a network device including:
an end position determining unit configured to determine an end position of data to be transmitted, in a radio frame over an unlicensed frequency band;
a position indication information determining unit configured to determine a position indication information according to the end position, wherein the position indication information instructs a user equipment to determine the end position of the data to be transmitted, in the radio frame over the unlicensed frequency band according to the position indication information; and
a sending unit configured to send the position indication information to the user equipment.

Preferably the position indication information is a sequence prescribed between the network device and the user equipment.

Preferably a symbol where the sequence is located is located in time domain in any one prescribed symbol between a start symbol and an end symbol where the data to be transmitted are transmitted, or in the start symbol where the data to be transmitted are transmitted, wherein the sequence occupies all the bandwidth or a specified part of the bandwidth in the frequency domain; or a symbol where the sequence is located is the end symbol where the data to be transmitted are transmitted, wherein the sequence occupies a specified part of the bandwidth.

Preferably the sending unit sends the position indication information to the user equipment via signaling, wherein the signaling is located in a symbol prescribed between the network device and the user equipment.

Preferably the signaling occupies a part of the bandwidth of the prescribed symbol.

Preferably the signaling is configured in a prescribed symbol in any one sub-frame between a sub-frame where a successful contention based access is achieved, and a sub-frame where the last complete available symbol, where the data to be transmitted are transmitted, is located.

Preferably the signaling is configured in the last complete available symbol in the sub-frame where a successful contention based access is achieved.

Preferably the signaling is carried over a carrier in the unlicensed frequency band, or carried over a primary carrier or a secondary carrier in a licensed frequency band.

Preferably the signaling is indicated in a DL grant of a Physical Downlink Shared Channel (PDSCH), or a DL grant of an enhanced Physical Downlink Control Channel (ePDCCH), over a secondary carrier in the unlicensed frequency band; or
the signaling is indicated in a DL grant of a PDSCH, or a DL grant of an ePDCCH, over a primary carrier in a licensed frequency band.

Preferably the signaling is further configured to indicate a position of a last sub-frame of channel occupancy time period on the unlicensed frequency.

Preferably in a sub-frame where the end position of the data to be transmitted is located, a PDSCH and an ePDCCH are transmitted in a frequency-division multiplexed mode, start points in time domain of the PDSCH and the ePDCCH are the same, and end points in time domain of the PDSCH and the ePDCCH are the same; and the start points in time domain of the PDSCH and the ePDCCH are located at a start point of the sub-frame where the end position of the data to be transmitted is located.

Preferably the end position of the data to be transmitted, in the radio frame is an end symbol of a PDSCH or an ePDCCH.

An embodiment of the invention provides a user equipment including:
a receiving unit configured to receive a position indication information of a radio frame in an unlicensed frequency band; and
a determining unit configured to determine an end position of transmitted data in a radio frame in the unlicensed frequency band according to the position indication information.

Preferably the position indication information is a sequence prescribed between a network device and the user equipment.

Preferably the determining unit is configured:
to determine the sequence in any one prescribed symbol between a start symbol and an end symbol where the data to be transmitted are transmitted, or in the start symbol where the data to be transmitted are transmitted, wherein the sequence occupies all the bandwidth or a specified part of the bandwidth in the frequency domain; or
to determine the sequence in the end symbol where the data to be transmitted are transmitted, wherein the sequence occupies a specified part of the bandwidth.

Preferably the receiving unit receives the position indication information in the radio frame in the unlicensed frequency band via signaling, wherein the signaling is located in a symbol prescribed between the network device and the user equipment.

Preferably the signaling occupies a part of the bandwidth of the prescribed symbol.

Preferably the signaling is configured in a prescribed symbol in any one sub-frame between a sub-frame where a successful contention based access is achieved, and a sub-frame where the last complete available symbol, where the data to be transmitted are transmitted, is located.

Preferably the signaling is configured in the last complete available symbol in the sub-frame where the network device competes for an access.

Preferably the determining unit is configured:
to obtain the signaling over a carrier in the unlicensed frequency band, or a primary carrier or a secondary carrier in a licensed frequency band.

Preferably the determining unit is configured:
to obtain the signaling in a DL grant of a Physical Downlink Shared Channel (PDSCH), or a DL grant of an enhanced Physical Downlink Control Channel (ePDCCH), over a secondary carrier in the unlicensed frequency band; or
to obtain the signaling in a DL grant of a PDSCH, or a DL grant of an ePDCCH, over a primary carrier in a licensed frequency band.

Preferably the determining unit is configured:
to obtain from the signaling a position of a last sub-frame of channel occupancy time period on the unlicensed frequency.

Preferably in a sub-frame where the end position of the data to be transmitted is located, a PDSCH and an ePDCCH are transmitted in a frequency-division multiplexed mode, start points in time domain of the PDSCH and the ePDCCH are the same, and end points in time domain of the PDSCH and the ePDCCH are the same; and the start points in time domain of the PDSCH and the ePDCCH are located at a start point of the sub-frame where the end position of the data to be transmitted is located.

Preferably the end position of the data to be transmitted, in the radio frame is an end symbol of a PDSCH or an ePDCCH.

An embodiment of the invention provides an eNB including:
a processor configured to read programs in a memory, and to perform the processes of: determining the end position of data to be transmitted, in a radio frame over an unlicensed frequency band; determining a position indication information according to the end position; and instructing a transceiver to send the position indication information, so that a user equipment determines the end position of the data to be transmitted, in the radio frame over the unlicensed frequency band according to the position indication information; and
the transceiver configured to be controlled by the processor to transmit and receive data.

An embodiment of the invention provides a mobile device including:
a processor configured to read programs in a memory, and to perform the processes of: instructing a transceiver to receive a position indication information of a radio frame in an unlicensed frequency band; and determining an end position of transmitted data in a radio frame in the unlicensed frequency band according to the position indication information; and the transceiver configured to be controlled by the processor to transmit and receive data.

In the methods according to the embodiments of the invention, the end position of the transmitted data in the radio frame in the unlicensed frequency band is indicated in the position indication information to the user equipment, so that the user equipment can determine the end position of the transmitted data in the radio frame according to the position indication information to thereby receive the data correctly according to the end position and receiving position of the transmitted data.

DETAILED DESCRIPTION OF THE EMBODIMENTS

In a communication system, if data to be transmitted are transmitted in an incomplete sub-frame in an unlicensed frequency band, then a User Equipment (UE) could not determine the end position of the data to be transmitted, in the received incomplete sub-frame. For a network device competing for a resource, frequently a complete sub-frame can not be transmitted due to competition for an access in the LBT mode, a period of time for the network device to prepare for data, a period of time for the network device to prepare for a radio frequency, and other factors. In order to improve the utilization ratio of resources, data can only be transmitted in an incomplete sub-frame. The length of the incomplete sub-frame is less than the length of a complete sub-frame, for example, in an LTE system, there are only 14 Orthogonal Frequency Division Multiplex (OFDM) symbols available in a complete sub-frame with a normal Cyclic Prefix (CP), and a sub-frame with less than 14 OFDM symbols is an incomplete sub-frame.

If there is an incomplete sub-frame in a radio frame, then for the user equipment, the start position of an information block to be transmitted is known or fixed, and the end position thereof is undetermined or variable, where the length of the information block to be transmitted is less than the length of a sub-frame; and for the network device, both the start position and the end position of the information block to be transmitted are known, but the start position is relatively fixed, and the end position is variable. Since the end position where the data are transmitted is undetermined or variable, and the start position where the data are transmitted is known or fixed, if the user equipment can not determine the end position where the data are transmitted in the incomplete sub-frame, then the user equipment will not obtain the transmitted data.

In order to address the problem that the user equipment can not determine the end position of the data to be transmitted, in the received radio frame, in the embodiments of the invention, the network device transmits the radio frame by sending a position indication information to indicate the end position of the data to be transmitted, in the radio frame to the user equipment, so that the user equipment can determine the end position where the data are transmitted in the radio frame, and further obtain correctly the data in the incomplete sub-frame.

The embodiments of the invention provide methods for transmitting data in an unlicensed frequency band respectively at the network side and the user equipment side, where the transmitting method at the network side, and the transmitting method at the user equipment side can be performed separately or in combination. The transmitting methods at the network side and the user equipment side will be described below respectively.

The methods according to the embodiments of the invention can be applicable to various mobile communication systems, and they will be described in the embodiments of the invention merely taking an LTE system as an example, although a repeated description of other mobile communication systems will be omitted here. In the embodiments of the invention, the term "symbol" refers to an OFDM symbol in the LTE system described by way of an example.

The embodiments of the invention will be described below in details with reference to the drawings.

Figure 3:
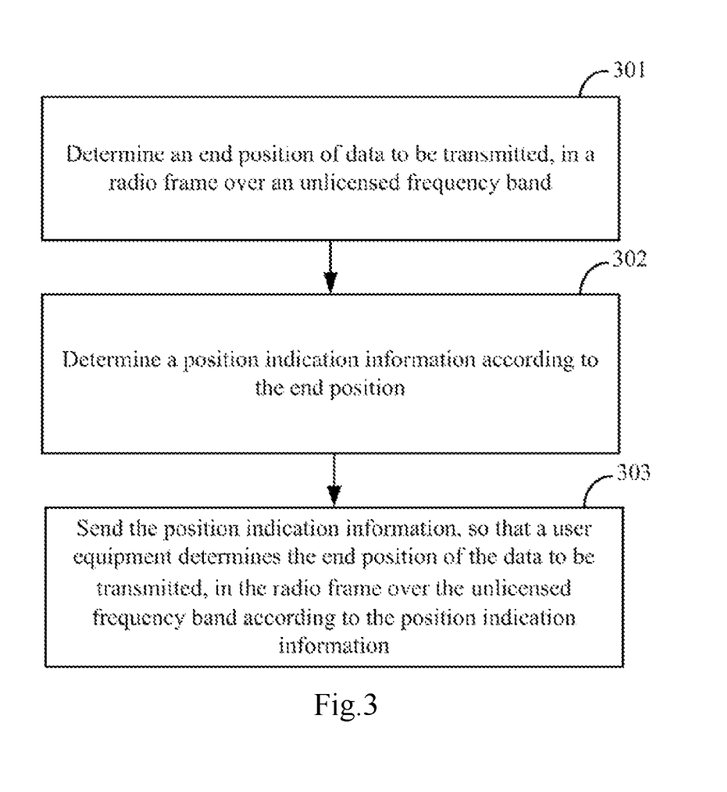
FIG. 3 is a flow chart of a method for transmitting data in an unlicensed frequency band according to an embodiment of the invention.

As illustrated in FIG. 3, there is a flow chart of a method for transmitting data in an unlicensed frequency band according to an embodiment of the invention, where the flow is performed by a network device which can be a device capable of accessing a network, e.g., an eNB. As illustrated, the flow can include:

The operation 301 is to determine an end position of data to be transmitted, in a radio frame over an unlicensed frequency band;

The operation 302 is to determine a position indication information according to the end position, where the position indication information instructs a user equipment to determine the end position of the data to be transmitted, in the radio frame over the unlicensed frequency band according to the position indication information; and The operation 303 is to send the position indication information to the user equipment.

In an LTE system, data to be transmitted, in a radio frame are mapped into, and transmitted in a Physical Downlink Shared Channel (PDSCH). Since a PDSCH and an enhanced Physical Downlink Control Channel (ePDCCH) can operate in the frequency-division multiplexed mode, start points of the PDSCH and the ePDCCH in the time domain are the same in this case, so the end position of the data to be transmitted refers to an end OFDM symbol of the PDSCH or the ePDCCH in an incomplete sub-frame in the radio frame.

The end position of the data to be transmitted, indicated by the position indication information refers to the sequence number of an end symbol in the radio frame where the data to be transmitted are carried, or the relative position of an end symbol in the radio frame, where the relative position refers to the number of symbols by which the end symbol of the data to be transmitted is spaced from the start of the radio frame or the sub-frame where the data to be transmitted are carried, or the number of symbols by which the end symbol of the data to be transmitted is spaced from the start of the radio frame or the sub-frame, or other substantially equivalent information.

In the operation 302 of the flow above, the determined position indication information can be a sequence prescribed between the network device and the user equipment; or the position indication information can be sent via signaling.

If the position indication information is a sequence, then the sequence will be prescribed in advance between the network device and the user equipment, that is, the sequence is a sequence known to both the network device and the user equipment. The sequence can be stored locally in the user equipment, or generated by the user equipment. In an implementation, the sequence is generated using a Pseudo-Noise (PN) sequence or a Constant Amplitude Zero Auto-Correlation (CAZAC) sequence as a base sequence. The sequence can alternatively be generated otherwise, so a repeated description thereof will be omitted here.

In the operation 303, the network device sends the sequence generally by locating the sequence in the last complete available OFDM symbol in the incomplete sub-frame, or in some OFDM symbol before the last complete available OFDM symbol. The sequence occupies all the bandwidth or a specified part of the bandwidth in the frequency domain.

If the sequence occupies all the bandwidth or a specified part of the bandwidth in the frequency domain, then the symbol where the sequence is located will be located in time domain in any one prescribed symbol between the start symbol and the end symbol where the data to be transmitted are transmitted, or in the start symbol where the data to be transmitted are transmitted, for example, the network device sends the sequence in an OFDM symbol preceding to the end OFDM symbol where the PDSCH is transmitted.

If the sequence occupies a specified part of the bandwidth, then the symbol where the sequence is located will be the end symbol of the data to be transmitted. For example, the network device sends the sequence in the end OFDM symbol where the PDSCH is transmitted, and the PDSCH and the sequence occupy different parts of the bandwidth in the frequency-division multiplexed mode. Preferably if the position indication information is a sequence, then the sequence will be carried over a carrier in an unlicensed frequency band where the sub-frame is located.

If the position indication information is sent via signaling, then the signaling will be located in a symbol prescribed between the network device and the user equipment, where the position where the position indication information is sent is fixed instead of being detected blindly by the user equipment.

The network device can configure the signaling in a prescribed symbol in any one sub-frame between a sub-frame where a successful contention based access is achieved, and the sub-frame where the last complete available symbol, where the data to be transmitted are transmitted, is located. Preferably a transmission period of time, and the end OFDM symbol in the last sub-frame can be indicated in signaling carried in some OFDM symbol in the sub-frame where a successful contention based access is achieved. Particularly after accessing successfully in the unlicensed frequency band in the LTE system, the longest period of time for which a channel is occupied once for transmission is known to the user equipment, where this period of time is reasonably an integer multiple of the length of time occupied by a sub-frame, so the network device can determine the position of the end OFDM symbol in the last incomplete sub-frame, in the sub-frame where a successful contention based access is achieved. Preferably the signaling is configured in the last complete available symbol in the sub-frame where a successful contention based access is achieved. The user equipment decodes the signaling, so that the user equipment can obtain the end where the channel is occupied once by the network device, no matter whether the user equipment has data to be transmitted. The network device accessing the channel can occupy the channel for a configurable period of time, or the network device can indicate the period of time for which the occupied channel is transmitted, as the position of the end OFDM symbol in the last sub-frame, for example, the end OFDM symbol in the last sub-frame can be indicated as the L-th OFDM symbol in the M-th sub-frame after the network device accesses a sub-frame, where M and L are nonnegative integers, thus indicating the entire transmission period of time, and the end OFDM symbol in the last sub-frame.

The signaling can alternatively be located in some prescribed OFDM symbol in the last sub-frame, and preferably the signaling is located in the first N-th OFDM symbol in the last sub-frame (N is a positive integer), where the position where the signaling is sent is fixed instead of being detected by the user equipment. Preferably the specified symbol is located in the last complete available symbol in the last sub-frame, where the signaling can be carried over the carrier where the incomplete sub-frame is located, or the signaling can be carried over another carrier to indicate the end symbol in the incomplete sub-frame across the carriers, that is, the signaling is carried over a carrier in the unlicensed frequency band, or over a primary carrier or a secondary carrier in a licensed frequency band. Preferably the signaling is carried in the licensed frequency band.

The user device decoding the last sub-frame has been synchronized in time and frequency using a discovery signal or otherwise to determine the boundary of the header in the last sub-frame, if the position indication information of the information block to be transmitted is configured and transmitted in the K-th Resource Block (RB) in the first OFDM symbol in the last sub-frame, where K is a nonnegative integer, then the user equipment can decode the sub-frame after obtaining the position indication information in the K-th RB in the first OFDM symbol in the sub-frame.

The signaling occupies all the bandwidth of the prescribed symbol in the frequency domain, or a part of the bandwidth. Preferably the position indication information generally indicates the sequence number of the end OFDM symbol of the PDSCH or the ePDCCH, or the relative position of the sequence number of the end OFDM symbol of the PDSCH or the ePDCCH in the last sub-frame, in several bits, the number of the bits is particularly determined as needed in reality. If the signaling occupies a specified part of the bandwidth, then the signaling and other information (e.g., a control channel, or the data to be transmitted) can occupy the same symbol in the frequency-division multiplexed mode. For example, the signaling can be sent in the end OFDM symbol of the PDSCH, and the signaling and the PDSCH can be transmitted in the frequency-division multiplexed mode.

The signaling can alternatively be indicated in a DL grant of the PDSCH, or a DL grant of the ePDCCH, over the secondary carrier in the unlicensed frequency band; or can be indicated in a DL grant of the PDSCH, or a DL grant of the ePDCCH, over a primary carrier in the licensed frequency band. For example, the DL grant indicating the signaling can be carried in a common search space.

When data are transmitted in a sub-frame in the LTE system, an L1/L2 control channel is located in the first P OFDM symbols in a complete sub-frame, where P is less than or equal to 4, and an OFDM symbol occupied by the L1/L2 control channel typically exists in an incomplete sub-frame in the unlicensed frequency band, so the PDCCH and the PDSCH can operate in the time-division multiplexed mode in the LTE protocol to thereby apply the original LTE protocol as much as possible.

However, if there are a small number of OFDM symbols, e.g., only 3 complete available OFDM symbols, in the incomplete sub-frame, then as per the LTE protocol, then a control channel will occupy the entire bandwidth in the frequency domain, and at least one OFDM symbol in the time domain, that is, a control overhead occupies at least ⅓ and even more of available resources, thus evidently degrading the utilization ratio of the resources. At this time the traditional L1/L2 control area in R8/R9 can be abandoned, but the ePDCCH and the PDSCH can operate in the frequency-division multiplexed mode. The sub-frame where the end position of the data to be transmitted is located is typically an incomplete sub-frame, so in the sub-frame where the end position of the data to be transmitted is located, the PDSCH and the ePDCCH are transmitted in the frequency-division multiplexed mode, and the start points in time domain of the PDSCH and the ePDCCH are the same, and the end points in time domain of the PDSCH and the ePDCCH are the same, where the start points in time domain of the PDSCH and the ePDCCH are located at the start point of the sub-frame where the end position of the data to be transmitted is located.

With the method according to the embodiments of the invention, the end position of the transmitted data in the radio frame in the unlicensed frequency band is indicated in the position indication information to the user equipment, so that the user equipment can determine the end position of the transmitted data in the radio frame according to the position indication information to thereby receive the data correctly.

Figure 4:
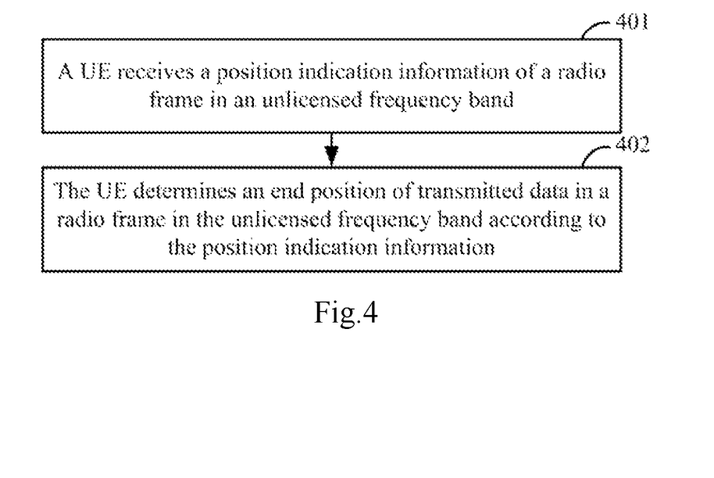
FIG. 4 is a flow chart of another method for transmitting data in an unlicensed frequency band according to an embodiment of the invention.

As illustrated in FIG. 4, there is a flow chart of another method for transmitting data in an unlicensed frequency band according to an embodiment of the invention, where the flow is performed by a user equipment which can be a user equipment capable of wireless communication, e.g., a mobile phone.

The flow can include:

The operation 401 is to receive a position indication information of a radio frame in an unlicensed frequency band; and The operation 402 is to determine an end position of transmitted data in a radio frame in the unlicensed frequency band according to the position indication information;

Where the position indication information has the same meaning, and is transmitted in the same way as those illustrated in FIG. 3, so a repeated description thereof will be omitted here.

If the position indication information is a sequence prescribed between a network device and the user equipment, then if the user equipment detects the sequence in the radio frame in the operation 401, then the user equipment will can determine the end position of the transmitted data in the received radio frame according to the value of the prescribed sequence, and the position of a symbol in which the sequence is located, in the operation 402 to thereby demodulate the radio frame for the data.

If the position indication information is sent via signaling, then the user equipment will obtain the signaling, and a sub-frame corresponding to the signaling, over a secondary carrier in the unlicensed frequency band, or a primary carrier in a licensed frequency band to thereby obtain the end position of the transmitted data in the sub-frame in the operation 401.

For example, the signaling for indicating the position indication information is transmitted in the K-th RB located at the middle of a frequency band in the last OFDM symbol in the last sub-frame in the radio frame as prescribed in an LTE system. The user equipment can be synchronized in time and frequency using a discovery signal or otherwise to determine the boundary of a tailer in an incomplete sub-frame, and detect the signaling in the K-th RB at the middle of the frequency band in the last OFDM symbol in the incomplete sub-frame to thereby obtain the end position of the transmitted data in the sub-frame according to the signaling.

As described above, the network device can have an ePDCCH and a PDSCH operated in the frequency-division multiplexed mode to thereby improve the utilization ratio of resources.

With the method according to the embodiments of the invention, the user equipment can determine the end position of the transmitted data in the radio frame according to the position indication information transmitted by the network device upon reception of the radio frame in the unlicensed frequency band, so that the user equipment can determine the end position of the transmitted data in the radio frame according to the position indication information to thereby receive the data correctly.

Figure 5:
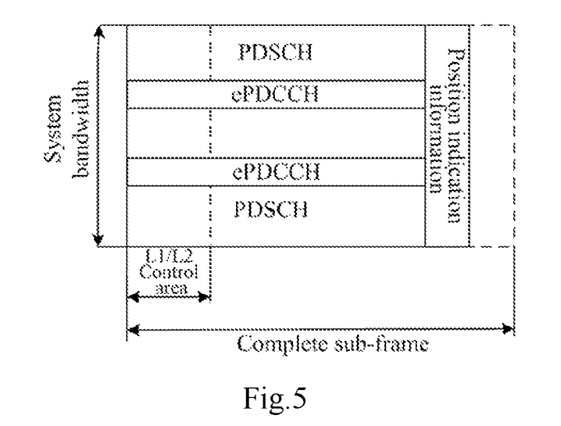
FIG. 5 is a schematic structural diagram of a first incomplete sub-frame in an unlicensed frequency band according to an embodiment of the invention.
Figure 7:
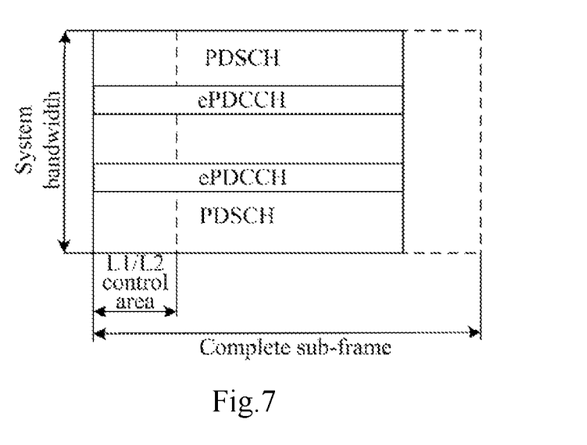
FIG. 7 is a schematic structural diagram of a third incomplete sub-frame in an unlicensed frequency band according to an embodiment of the invention.
Figure 8:
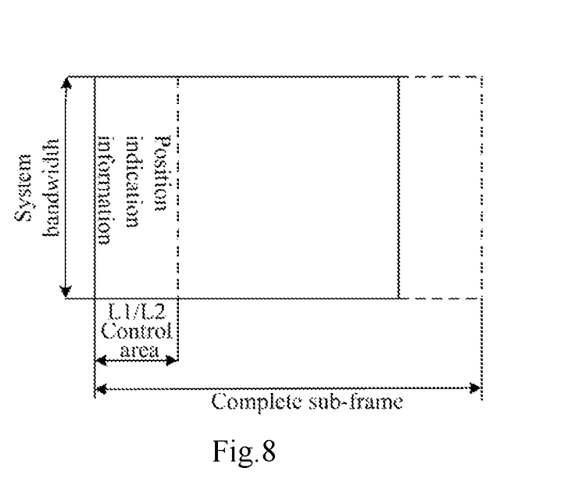
FIG. 8 is a schematic structural diagram of a fourth incomplete sub-frame in an unlicensed frequency band according to an embodiment of the invention.

As described above, the position indication information can be represented in two patterns, and the following description will be given taking an LTE system as an example with reference to FIG. 5 and FIG. 8 illustrating schematic structural diagrams of various combination patterns in which the last sub-frame is an incomplete sub-frame.

As illustrated in FIG. 5, the data to be transmitted are mapped onto and transmitted in a PDSCH, and an ePDCCH and a PDSCH operate in the time-division multiplexed mode. The start points in time domain of the PDSCH and the ePDCCH are the same, and both of them are located at the start point of the incomplete sub-frame. The position indication information is a sequence prescribed between the network device and the user equipment.

The sequence located in the last complete available OFDM symbol in the incomplete sub-frame can occupy the entire bandwidth, or a part of the bandwidth, and if the sequence occupies a part of the bandwidth, then the PDSCH and the ePDCCH may also occupy a frequency resource of the OFDM symbol where the sequence is located.

The user equipment firstly buffers the entire last incomplete sub-frame, and then detects the known sequence, and once the sequence located at the tailer is detected, then the user equipment can determine the end OFDM symbol in the incomplete sub-frame to thereby decode the ePDCCH and the PDSCH.

Figure 6:
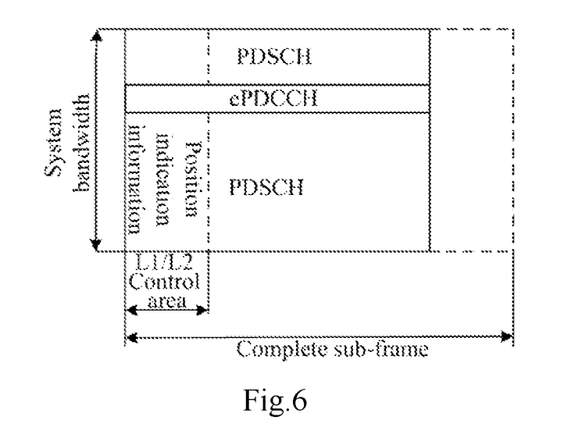
FIG. 6 is a schematic structural diagram of a second incomplete sub-frame in an unlicensed frequency band according to an embodiment of the invention.

As illustrated in FIG. 6, the data to be transmitted are mapped onto and transmitted in a PDSCH, and an ePDCCH and a PDSCH operate in the frequency-division multiplexed mode. The start points in time domain of the PDSCH and the ePDCCH are the same, and both of them are located at the start point of the incomplete sub-frame. The position indication information is signaling. The signaling occupies a part of the bandwidth, and the signaling and the PDSCH together occupy an OFDM symbol in the frequency-division multiplexed mode, where the OFDM symbol where the sequence is located is located at the start OFDM symbol in the PDSCH.

The user equipment determines the position of the end OFDM symbol in the sub-frame upon detection of the signaling, and then decodes the ePDCCH and the PDSCH according to the position of the end OFDM symbol.

As illustrated in FIG. 7, the data to be transmitted are mapped onto and transmitted in a PDSCH, and an ePDCCH and a PDSCH operate in the frequency-division multiplexed mode. The start points in time domain of the PDSCH and the ePDCCH are the same, and both of them are located at the start point of the incomplete sub-frame. The position indication information is signaling. The signaling is located in some OFDM symbol in a sub-frame where the network device competes for an access.

The user equipment determines the position of the end OFDM symbol in the incomplete sub-frame upon detection of the signaling in some OFDM symbol in the sub-frame where a successful contention based access is achieved, and then decodes the ePDCCH and the PDSCH according to the position of the end OFDM symbol.

As illustrated in FIG. 8, the position indication information is signaling configured and transmitted in the K-th RB in the first OFDM symbol in the last incomplete sub-frame. Of course, the signaling can alternatively be located in some specific OFDM symbol in the incomplete sub-frame. At this time the signaling is sent at such a position that is prescribed by the network device and the user equipment instead of being detected by the user equipment. The user device decoding the last incomplete sub-frame has been synchronized in time and frequency using a discovery signal or otherwise to determine the start symbol in the incomplete sub-frame, and then determine the end symbol of the data to be transmitted, according to the signaling in the K-th RB in the first OFDM symbol in the incomplete sub-frame to thereby decode the last incomplete sub-frame.

For the flows of the methods above, embodiments of the invention further provide a network device and a user equipment, and reference can be made to the implementations of the methods above for implementations of the network device and the user equipment, so a repeated description thereof will be omitted here.

Figure 9:
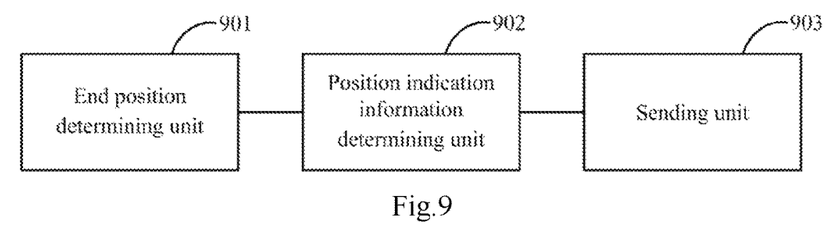
FIG. 9 is a structural diagram of a network device according to an embodiment of the invention.

As illustrated in FIG. 9, there is a structural diagram of a network device according to an embodiment of the invention, which includes:

An end position determining unit 901 configured to determine an end position of data to be transmitted, in a radio frame over an unlicensed frequency band;

A position indication information determining unit 902 configured to determine a position indication information according to the end position; and A sending unit 903 configured to send the position indication information, so that a user equipment determines the end position of the data to be transmitted, in the radio frame over the unlicensed frequency band according to the position indication information.

Preferably the position indication information is a sequence prescribed between the network device and the user equipment.

Preferably a symbol where the sequence is located is located in time domain in any one prescribed symbol between a start symbol and an end symbol where the data to be transmitted are transmitted, or in the start symbol where the data to be transmitted are transmitted, where the sequence occupies all the bandwidth or a specified part of the bandwidth in the frequency domain; or A symbol where the sequence is located is the end symbol where the data to be transmitted are transmitted, where the sequence occupies a specified part of the bandwidth.

Preferably the position indication information is sent via signaling, where the signaling is located in a symbol prescribed between the network device and the user equipment.

Preferably the signaling occupies a part of the bandwidth of the prescribed symbol.

Preferably the signaling is configured in a prescribed symbol in any one sub-frame between a sub-frame where a successful contention based access is achieved, and a sub-frame where the last complete available symbol, where the data to be transmitted are transmitted, is located.

Preferably the signaling is configured in the last complete available symbol in the sub-frame where a successful contention based access is achieved.

Preferably the signaling is carried over a carrier in the unlicensed frequency band, or carried over a primary carrier or a secondary carrier in a licensed frequency band.

Preferably the signaling is indicated in a DL grant of a Physical Downlink Shared Channel (PDSCH), or a DL grant of an enhanced Physical Downlink Control Channel (ePDCCH), over a secondary carrier in the unlicensed frequency band; or The signaling is indicated in a DL grant of a PDSCH, or a DL grant of an ePDCCH, over a primary carrier in a licensed frequency band.

Preferably the signaling is further configured to indicate the position of the last sub-frame of channel occupancy time period on the unlicensed frequency.

Preferably in a sub-frame where the end position of the data to be transmitted is located, a PDSCH and an ePDCCH are transmitted in the frequency-division multiplexed mode, start points in time domain of the PDSCH and the ePDCCH are the same, and end points in time domain of the PDSCH and the ePDCCH are the same; and the start points in time domain of the PDSCH and the ePDCCH are located at the start point of the sub-frame where the end position of the data to be transmitted is located.

Preferably the end position of the data to be transmitted, in the radio frame is an end symbol of a PDSCH or an ePDCCH.

Figure 10:
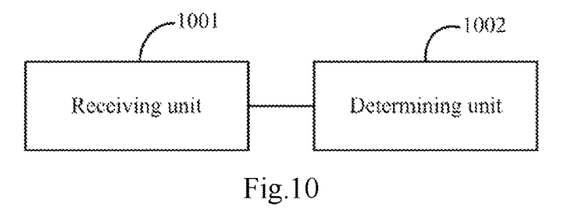
FIG. 10 is a structural diagram of a user equipment according to an embodiment of the invention.

As illustrated in FIG. 10, there is a structural diagram of a user equipment according to an embodiment of the invention, which includes:

A receiving unit 1001 configured to receive a position indication information of a radio frame in an unlicensed frequency band; and A determining unit 1002 configured to determine an end position of transmitted data in a radio frame in the unlicensed frequency band according to the position indication information.

Preferably the position indication information is a sequence prescribed between a network device and the user equipment.

Preferably the determining unit is configured:

To determine the sequence in any one prescribed symbol between a start symbol and an end symbol where the data to be transmitted are transmitted, or in the start symbol where the data to be transmitted are transmitted, where the sequence occupies all the bandwidth or a specified part of the bandwidth in the frequency domain; or To determine the sequence in the end symbol where the data to be transmitted are transmitted, where the sequence occupies a specified part of the bandwidth.

Preferably the position indication information is sent via signaling, where the signaling is located in a symbol prescribed between the network device and the user equipment.

Preferably the signaling occupies a part of the bandwidth of the prescribed symbol.

Preferably the signaling is configured in a prescribed symbol in any one sub-frame between a sub-frame where a successful contention based access is achieved, and a sub-frame where the last complete available symbol, where the data to be transmitted are transmitted, is located.

Preferably the signaling is configured in the last complete available symbol in the sub-frame where a successful contention based access is achieved.

Preferably the determining unit 1002 is configured:

To obtain the signaling over a carrier in the unlicensed frequency band, or a primary carrier or a secondary carrier in a licensed frequency band.

Preferably the determining unit 1002 is configured:

To obtain the signaling in a DL grant of a PDSCH, or a DL grant of an ePDCCH, over a secondary carrier in the unlicensed frequency band; or To obtain the signaling in a DL grant of a PDSCH, or a DL grant of an ePDCCH, over a primary carrier in a licensed frequency band.

Preferably the determining unit 1002 is configured:

To obtain from the signaling the position of the last sub-frame of channel occupancy time period on the unlicensed frequency.

Preferably in a sub-frame where the end position of the data to be transmitted is located, a PDSCH and an ePDCCH are transmitted in the frequency-division multiplexed mode, start points in time domain of the PDSCH and the ePDCCH are the same, and end points in time domain of the PDSCH and the ePDCCH are the same; and the start points in time domain of the PDSCH and the ePDCCH are located at the start point of the sub-frame where the end position of the data to be transmitted is located.

Preferably the end position of the data to be transmitted, in the radio frame is an end symbol of a PDSCH or an ePDCCH.

For the flows of the methods above, embodiments of the invention further provide an eNB and a mobile device, and reference can be made to the implementations of the methods above for implementations of the eNB and the mobile device, so a repeated description thereof will be omitted here.

Figure 11:
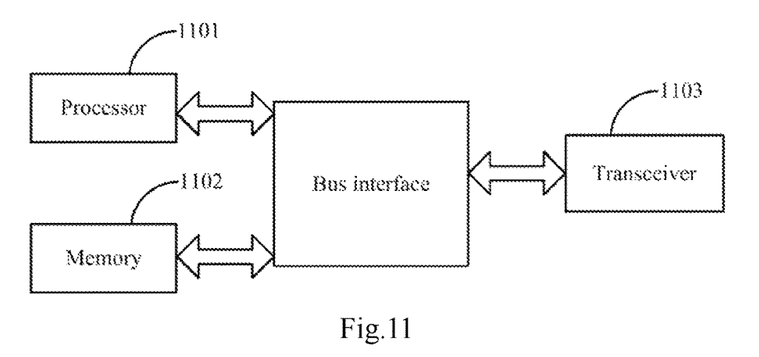
FIG. 11 is a structural diagram of an eNB according to an embodiment of the invention.

As illustrated in FIG. 11, there is a structural diagram of an eNB according to an embodiment of the invention, which includes:

A processor 1101 configured to read programs in a memory 1102, and to perform the processes of: determining the end position of data to be transmitted, in a radio frame over an unlicensed frequency band; determining a position indication information according to the end position; and instructing a transceiver 1103 to send the position indication information, so that a user equipment determines the end position of the data to be transmitted, in the radio frame over the unlicensed frequency band according to the position indication information; and The transceiver 1103 configured to be controlled by the processor 1101 to transmit and receive data.

Preferably the position indication information is a sequence prescribed between the network device and the user equipment.

Preferably a symbol where the sequence is located is located in time domain in any one prescribed symbol between a start symbol and an end symbol where the data to be transmitted are transmitted, or in the start symbol where the data to be transmitted are transmitted, where the sequence occupies all the bandwidth or a specified part of the bandwidth in the frequency domain; or A symbol where the sequence is located is the end symbol where the data to be transmitted are transmitted, where the sequence occupies a specified part of the bandwidth.

Preferably the position indication information is sent via signaling, where the signaling is located in a symbol prescribed between the network device and the user equipment.

Preferably the signaling occupies a part of the bandwidth of the prescribed symbol.

Preferably the signaling is configured in a prescribed symbol in any one sub-frame between a sub-frame where a successful contention based access is achieved, and a sub-frame where the last complete available symbol, where the data to be transmitted are transmitted, is located.

Preferably the signaling is configured in the last complete available symbol in the sub-frame where a successful contention based access is achieved.

Preferably the signaling is carried over a carrier in the unlicensed frequency band, or carried over a primary carrier or a secondary carrier in a licensed frequency band.

Preferably the signaling is indicated in a DL grant of a PDSCH, or a DL grant of an ePDCCH, over a secondary carrier in the unlicensed frequency band; or The signaling is indicated in a DL grant of a PDSCH, or a DL grant of an ePDCCH, over a primary carrier in a licensed frequency band.

Preferably the signaling is further configured to indicate the position of the last sub-frame of channel occupancy time period on the unlicensed frequency.

Preferably in a sub-frame where the end position of the data to be transmitted is located, a PDSCH and an ePDCCH are transmitted in the frequency-division multiplexed mode, start points in time domain of the PDSCH and the ePDCCH are the same, and end points in time domain of the PDSCH and the ePDCCH are the same; and the start points in time domain of the PDSCH and the ePDCCH are located at the start point of the sub-frame where the end position of the data to be transmitted is located.

Preferably the end position of the data to be transmitted, in the radio frame is an end symbol of a PDSCH or an ePDCCH.

Here in FIG. 11, the bus architecture can include any number of interconnected buses and bridges, and particularly link together various circuits of one or more processors represented by the processor 1101, and a memory represented by the memory 1102. The bus architecture can further link together various other circuits, e.g., peripheral devices, a voltage stabilizer, a power management circuit, etc., all of which are well known in the art, so a further description thereof will be omitted in this context. The bus interface serves as an interface. The transceiver 1103 can include a number of elements including a transmitter and a receiver serving as elements configured to communicate with various other devices over a transmission medium. The processor 1101 is responsible for managing the bus architecture and performing other normal processes, and the memory 1102 can store data for use by the processor 1101 in performing the operations.

Figure 12:
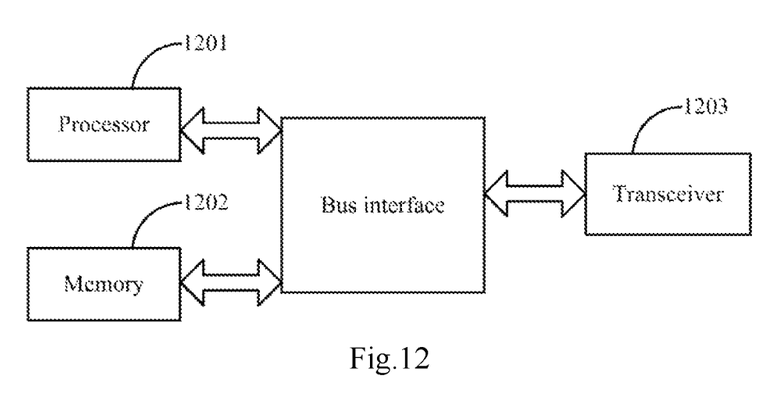
FIG. 12 is a structural diagram of a mobile device according to an embodiment of the invention.

As illustrated in FIG. 12, there is a structural diagram of a mobile device according to an embodiment of the invention, which includes:

A processor 1201 configured to read programs in a memory 1202, and to perform the processes of: instructing a transceiver 1203 to receive a position indication information of a radio frame in an unlicensed frequency band; and determining an end position of transmitted data in a radio frame in the unlicensed frequency band according to the position indication information; and The transceiver 1203 configured to be controlled by the processor 1201 to transmit and receive data.

Preferably the position indication information is a sequence prescribed between a network device and the user equipment.

Preferably the processor 1201 is configured:

To determine the sequence in any one prescribed symbol between a start symbol and an end symbol where the data to be transmitted are transmitted, or in the start symbol where the data to be transmitted are transmitted, where the sequence occupies all the bandwidth or a specified part of the bandwidth in the frequency domain; or To determine the sequence in the end symbol where the data to be transmitted are transmitted, where the sequence occupies a specified part of the bandwidth.

Preferably the position indication information is sent via signaling, where the signaling is located in a symbol prescribed between the network device and the user equipment.

Preferably the signaling occupies a part of the bandwidth of the prescribed symbol.

Preferably the signaling is configured in a prescribed symbol in any one sub-frame between a sub-frame where a successful contention based access is achieved, and a sub-frame where the last complete available symbol, where the data to be transmitted are transmitted, is located.

Preferably the signaling is configured in the last complete available symbol in the sub-frame where a successful contention based access is achieved.

Preferably the processor 1201 is configured:

To obtain the signaling over a carrier in the unlicensed frequency band, or a primary carrier or a secondary carrier in a licensed frequency band.

Preferably the processor 1201 is configured:

To obtain the signaling in a DL grant of a PDSCH, or a DL grant of an ePDCCH, over a secondary carrier in the unlicensed frequency band; or To obtain the signaling in a DL grant of a PDSCH, or a DL grant of an ePDCCH, over a primary carrier in a licensed frequency band.

Preferably the processor 1201 is configured:

To obtain from the signaling the position of the last sub-frame of channel occupancy time period on the unlicensed frequency.

Preferably in a sub-frame where the end position of the data to be transmitted is located, a PDSCH and an ePDCCH are transmitted in the frequency-division multiplexed mode, start points in time domain of the PDSCH and the ePDCCH are the same, and end points in time domain of the PDSCH and the ePDCCH are the same; and the start points in time domain of the PDSCH and the ePDCCH are located at the start point of the sub-frame where the end position of the data to be transmitted is located.

Preferably the end position of the data to be transmitted, in the radio frame is an end symbol of a PDSCH or an ePDCCH.

Here in FIG. 12, the bus architecture can include any number of interconnected buses and bridges, and particularly link together various circuits of one or more processors represented by the processor 1201, and a memory represented by the memory 1202. The bus architecture can further link together various other circuits, e.g., peripheral devices, a voltage stabilizer, a power management circuit, etc., all of which are well known in the art, so a further description thereof will be omitted in this context. The bus interface serves as an interface. The transceiver 1203 can include a number of elements including a transmitter and a receiver serving as elements configured to communicate with various other devices over a transmission medium. The processor 1201 is responsible for managing the bus architecture and performing other normal processes, and the memory 1202 can store data for use by the processor 1201 in performing the operations.

The end position of the data to be transmitted, in the radio frame is indicated in the position indication information to the user equipment, so that the user equipment can receive the data correctly. The indicating method according to the embodiments of the invention is simple, the data can be transmitted efficiently, and the available time-frequency resources can be made full use of, thus avoiding the resources from being wasted.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting data in an unlicensed frequency band, the method comprising:
   determining, by a network device, an end position of data to be transmitted, in a radio frame over the unlicensed frequency band;
   determining, by the network device, a position indication information according to the end position, wherein the position indication information instructs a user equipment to determine the end position of the data to be transmitted, in the radio frame over the unlicensed frequency band according to the position indication information; and
   sending, by the network device, the position indication information to the user equipment;
   wherein sending, by the network device, the position indication information to the user equipment comprises:
   sending, by the network device, the position indication information to the user equipment via signaling, wherein the signaling is configured in a prescribed symbol in any one sub-frame between a sub-frame where a successful contention based access is achieved, and a sub-frame where a last complete available symbol, where the data to be transmitted are transmitted, is located.

2. The method according to claim 1, wherein the position indication information is a sequence prescribed between the network device and the user equipment; and
   a symbol where the sequence is located, is located in time domain in any one prescribed symbol between a start symbol and an end symbol where the data to be transmitted are transmitted, or in the start symbol where the data to be transmitted are transmitted, wherein the sequence occupies all the bandwidth or a specified part of the bandwidth in a frequency domain; or
   a symbol where the sequence is located, is the end symbol where the data to be transmitted are transmitted, wherein the sequence occupies a specified part of the bandwidth.

3. The method according to claim 1, wherein the signaling is carried over a carrier in the unlicensed frequency band, or carried over a primary carrier or a secondary carrier in a licensed frequency band.

4. The method according to claim 1, wherein the signaling is indicated in a Downlink (DL) grant of a Physical Downlink Shared Channel (PDSCH), or a DL grant of an enhanced Physical Downlink Control Channel (ePDCCH), over a secondary carrier in the unlicensed frequency band; or
   the signaling is indicated in a DL grant of a PDSCH, or a DL grant of an ePDCCH, over a primary carrier in a licensed frequency band.

5. The method according to claim 1, wherein the signaling is further configured to indicate a position of a last sub-frame of channel occupancy time period on the unlicensed frequency.

6. The method according to claim 1, wherein in a sub-frame where the end position of the data to be transmitted is located, a PDSCH and an ePDCCH are transmitted in a frequency-division multiplexed mode, start points in time domain of the PDSCH and the ePDCCH are the same, and end points in time domain of the PDSCH and the ePDCCH are the same; and the start points in time domain of the PDSCH and the ePDCCH are located at a start point of the sub-frame where the end position of the data to be transmitted is located.

7. The method according to claim 1, wherein the end position of the data to be transmitted, in the radio frame is an end symbol of a PDSCH or an ePDCCH.

8. A method for transmitting data in an unlicensed frequency band, the method comprising:
   receiving, by a user equipment, a position indication information of a radio frame in an unlicensed frequency band; and
   determining, by the user equipment, an end position of transmitted data in a radio frame in the unlicensed frequency band according to the position indication information;
   wherein the receiving, by the user equipment, the position indication information of the radio frame in the unlicensed frequency band comprises:
   receiving, by the user equipment, the position indication information of the radio frame in the unlicensed frequency band via signaling, wherein the signaling is configured in a prescribed symbol in any one sub-frame between a sub-frame where a successful contention based access is achieved, and a sub-frame where a last complete available symbol, where the data to be transmitted are transmitted, is located.

9. The method according to claim 8, wherein the position indication information is a sequence prescribed between a network device and the user equipment; and
   wherein determining, by the user equipment, the end position of the transmitted data in the radio frame in the unlicensed frequency band according to the position indication information comprises:
   determining, by the user equipment, the sequence in any one prescribed symbol between a start symbol and an end symbol where the data to be transmitted are transmitted, or in the start symbol where the data to be transmitted are transmitted, wherein the sequence occupies all the bandwidth or a specified part of the bandwidth in a frequency domain; or
   determining, by the user equipment, the sequence in the end symbol where the data to be transmitted are transmitted, wherein the sequence occupies a specified part of the bandwidth.

10. The method according to claim 8, wherein receiving, by the user equipment, the position indication information in the radio frame in the unlicensed frequency band comprises:
    obtaining, by the user equipment, the signaling over a carrier in the unlicensed frequency band, or a primary carrier or a secondary carrier in a licensed frequency band.

11. The method according to claim 8, wherein receiving, by the user equipment, the position indication information in the radio frame in the unlicensed frequency band comprises:
    obtaining, by the user equipment, the signaling in a DL grant of a Physical Downlink Shared Channel (PDSCH), or a DL grant of an enhanced Physical Downlink Control Channel (ePDCCH), over a secondary carrier in the unlicensed frequency band; or
    obtaining, by the user equipment, the signaling in a DL grant of a PDSCH, or a DL grant of an ePDCCH, over a primary carrier in a licensed frequency band.

12. The method according to claim 8, wherein the user equipment further obtains from the signaling a position of a last sub-frame of channel occupancy time period on the unlicensed frequency.

13. The method according to claim 8, wherein in a sub-frame where the end position of the data to be transmitted is located, a PDSCH and an ePDCCH are transmitted in a frequency-division multiplexed mode, start points in time domain of the PDSCH and the ePDCCH are the same, and end points in time domain of the PDSCH and the ePDCCH are the same; and the start points in time domain of the PDSCH and the ePDCCH are located at a start point of the sub-frame where the end position of the data to be transmitted is located.

14. The method according to claim 8, wherein the end position of the data to be transmitted, in the radio frame is an end symbol of a PDSCH or an ePDCCH.

15. A network device, comprising: at least one processor, and
 a memory communicably connected with the at least one processor for storing programs executable by the at least one processor, wherein execution of the programs by the at least one processor causes the at least one processor to:
 determine an end position of data to be transmitted, in a radio frame over an unlicensed frequency band;
 determine a position indication information according to the end position, wherein the position indication information instructs a user equipment to determine the end position of the data to be transmitted, in the radio frame over the unlicensed frequency band according to the position indication information; and
 send the position indication information to the user equipment via signaling, wherein the signaling is configured in a prescribed symbol in any one sub-frame between a sub-frame where a successful contention based access is achieved, and a sub-frame where a last complete available symbol, where the data to be transmitted are transmitted, is located.

16. A user equipment, comprising: at least one processor, and
 a memory communicably connected with the at least one processor for storing programs executable by the at least one processor, wherein execution of the programs by the at least one processor causes the at least one processor to:
 receive a position indication information of a radio frame in an unlicensed frequency band via signaling, wherein the signaling is configured in a prescribed symbol in any one sub-frame between a sub-frame where a successful contention based access is achieved, and a sub-frame where a last complete available symbol, where the data to be transmitted are transmitted, is located; and
 determine an end position of transmitted data in a radio frame in the unlicensed frequency band according to the position indication information.

* * * * *